United States Patent

Shields

[15] 3,674,066
[45] July 4, 1972

[54] TREE SHEAR
[72] Inventor: Dean W. Shields, Toledo, Ohio
[73] Assignee: Owens-Illinois, Inc., Toledo, Ohio
[22] Filed: June 11, 1970
[21] Appl. No.: 45,313

[52] U.S. Cl. ......................................................... 144/34 E
[51] Int. Cl. .......................................................... A01g 23/02
[58] Field of Search ............ 144/2 Z, 3 D, 34 R, 34 E, 309 AC

[56] References Cited

UNITED STATES PATENTS

| | | | |
|---|---|---|---|
| 2,697,459 | 12/1954 | McFaull | 144/34 E |
| 3,348,592 | 10/1967 | Winblad et al. | 144/34 E |
| 3,230,988 | 1/1966 | Dixon | 144/34 E |
| 3,565,138 | 2/1971 | Albright | 144/34 R |

Primary Examiner—Gerald A. Dost
Attorney—Alan J. Steger and E. J. Holler

[57] ABSTRACT

A novel and improved tree shear adapted to sever a standing tree at ground level. The shear utilizes one stationary cutting blade and one movable cutting blade. The fixed cutting blade provides the reactionary force and cuts through one-half of the tree as the moving blade builds up force from its actuating cylinder to cut through the other half of the tree.

4 Claims, 2 Drawing Figures

TREE SHEAR

BACKGROUND OF THE INVENTION

This invention relates to a novel and improved tree shear adapted to sever a standing tree at ground level.

More specifically, this invention relates to a novel tree shear which features one fixed cutting blade and one movable cutting blade. This tree shear is well suited to be utilized as an integral part of a tree harvesting apparatus such as that disclosed in my copending U.S. Ser. No. 45,314 filed June 11, 1970 and assigned to the same Assignee as the subject invention.

Historically, trees have been felled by using hand saws manually, manipulated power saws, axes, wedges and guide ropes. These procedures obviously require a considerable amount of manual labor. In order to reduce the amount and cost of the manual labor various machines, including the tree harvester of my above-identified copending patent application, have been proposed. These machines all include heavy, cumbersome butt shear devices which have two movable cutting blades actuatable to sever a standing tree. These existing butt shear devices require two separate actuating systems which add considerably to the weight of the device.

It is, therefore, an object of this invention to provide a novel and improved tree shear which overcomes the disadvantages associated with previously known tree shears.

SUMMARY OF THE INVENTION

This invention provides a novel and improved tree shear adapted to sever a standing tree at ground level.

In general, the tree shear of this invention utilizes one fixed cutting blade and one movable cutting blade. The movable cutting blade is mounted on a pin which is an integral part of the fixed cutting blade housing and is fastened to the tree harvesting apparatus of which this tree shear is an important component. The movable cutting blade is actuated by means of a hydraulically responsive system mounted within the fixed cutting blade housing. The fixed cutting blade provides the reactionary force and actually cuts through one-half of the tree as the moving blade builds up force from its actuating cylinder to cut through the other half of the tree. In order to effectively cut a tree as close to ground level as possible, the cutting blades of the tree shear of this invention are offset below the center line of the actuating cylinder. In addition, the pin about which the movable cutting blade rotates is eccentric in the area where it holds the movable cutting blade to provide for adjustment of the edges of the cutting blades as wear is experienced.

Other objects, features, and advantages of this invention will become obvious upon reference to the following detailed description of the invention and the drawings illustrating the preferred embodiment thereof.

IN THE DRAWINGS

DETAILED DESCRIPTION OF THE INVENTION

Figure 1:
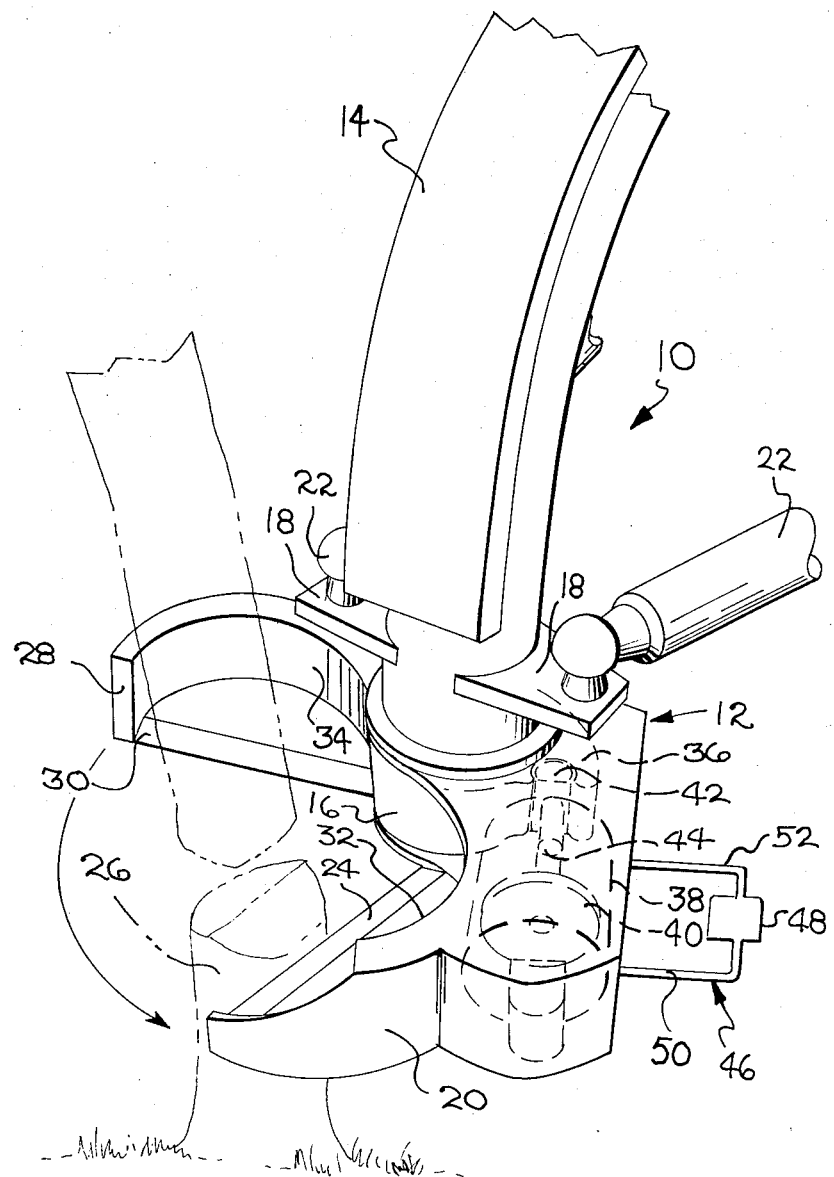
FIG. 1 is a perspective view of the improved tree shear of this invention.
Figure 2:
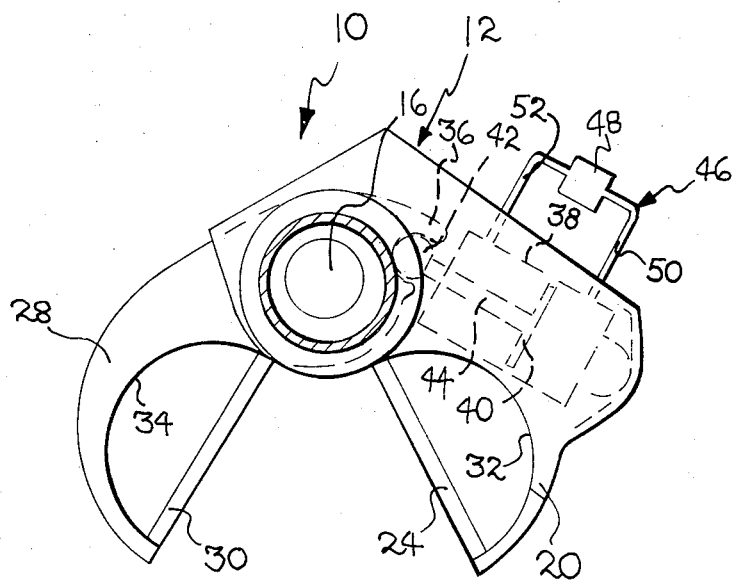
FIG. 2 is a top view with parts broken away in section of the tree shear of FIG. 1.

A tree shear incorporating the novel features of this invention is shown in FIGS. 1 and 2 and is indicated generally by the numeral 10. The tree shear 10 includes a main body member 12 which is fastened to the front end portion 14 of a tree harvesting apparatus (not shown). The main body member 12 is formed in one solid piece but is comprised of a number of different component parts. The main body member 12 includes an eccentric pin 16, a pair of reinforcing flanges 18, and a fixed cutting blade frame 20. A pair of stabilizing arms 22 are attached at one end to the reinforcing flanges 18 and at the other end to the tree harvester (not shown). These stabilizing arms 22 serve to strengthen and stabilize the tree shear 10 and to control its position relative to the front end portion 14 of the tree harvester. The fixed cutting blade frame 20 includes a fixed cutting blade edge 24 which is tapered and sharpened so as to be able to slice into and cut through a portion of the diameter of a tree 26.

Mounted for rotating movement on the eccentric pin 16 is a movable cutting blade frame 28. The movable cutting blade frame 28 includes a movable cutting blade edge 30 which is also tapered and sharpened so as to be able to slice into and cut through a portion of the diameter of the tree 26. Thus, when actuated the fixed cutting blade edge 24 and the movable cutting blade edge 30 are adapted to completely sever the trunk of a standing tree. It should be noted that both the fixed cutting blade frame 20 and the movable cutting blade frame 28 are formed so as to include semi-circular portions 32 and 34, respectively, which define open areas above the cutting blades to provide a tree engaging and supporting platform when the cutting blade edges 24 and 30 remain in mating engagement after severing a tree.

The movable cutting blade frame 28 includes an actuating socket 36 formed on the diametrically opposite side of the eccentric pin 16 from the movable cutting blade edge 30. An actuating cylinder 38 for the movable cutting blade frame 28 is formed within the fixed cutting blade frame 20. Mounted for reciprocating movement within the cylinder 38 is a piston 40 which in turn is connected to an actuating ball 42 positioned within actuating socket 36 in movable cutting blade frame 28 by means of connecting rod 44. Thus, reciprocating movement of piston 40 within cylinder 38 results in corresponding movement of ball 42 and rotation of movable cutting blade frame 28 about eccentric pin 16. The piston 40 is reciprocated relative to cylinder 38 by means of a reversible hydraulic fluid system shown schematically and indicated generally by the numeral 46. The reversible hydraulic fluid system 46 includes a reversible hydraulic fluid source 48 which is connected to the ends of cylinder 38 on opposite sides of piston 40 by means of hydraulic lines 50 and 52. When it is desired to rotate the movable cutting blade edge 30 into a closed position in engagement with fixed cutting blade edge 24, reversible hydraulic fluid source 48 is activated to pump hydraulic fluid through line 50 into cylinder 38 to push piston 40 towards line 52 so that ball 42 is forced against socket 36 to pivot movable cutting blade frame 28 about eccentric pin 16 in the direction of the arrow shown in FIG. 1. Conversely, when it is desired to retract the movable cutting blade edge 30 to the open position as shown in FIG. 1, the reversible hydraulic fluid source 48 is reversed to withdraw fluid from cylinder 38 through lines 50 and pump the fluid into cylinder 38 through line 52 on the opposite side of piston 40. This reversing of the fluid causes piston 40 to be displaced toward line 50 thereby pulling ball 42 in socket 36 to pivot movable cutting blade frame about eccentric pin 16.

Pin 16 is eccentric so that the center of rotation of movable cutting blade frame 28 is slightly displaced from the axis about which fixed cutting blade frame 20 would rotate if it were pivotable. Thus, when movable cutting edge 30 pivots into engagement with fixed cutting edge 24 the outer extremity portions of each cutting edge engage before the inner portions meet. Hence, the eccentricity of pin 16 results in a non-uniform mating of the cutting edges 24 and 30. However, this result is very desirable in that it compensates for wear of the respective cutting edges. Experience has shown that these outer extremity portions of tree shear cutting edges wear down much more rapidly than do the inner extremities such that worn cutting edges never fully engage and the tree being cut is not completely severed. Thus, as the outer extremity portions begin to wear down the cutting edges of the tree shear of this invention continue to engage each other for a much longer period of time due to the eccentricity of pin 16. Hence, the life of the respective cutting edges is lengthened considerably and the necessity of frequently replacing worn blades is eliminated.

It has been generally noted that in order to successfully cut a standing tree at ground level with hydraulic power, the cutting edges must be set below the center line of the hydraulic cylinders. This arrangement results in the development of high internal eccentric forces in the shear assembly. It has been found that these internal eccentric forces are more easily controlled by the tree shear of the present invention utilizing only one movable cutting blade and one actuating cylinder as compared with previous shears which had two movable blades and two actuating cylinders.

Thus, the present invention provides a unique tree shear which, by virtue of its having only one movable cutting blade, requires only one actuating system and, therefore, is lighter in weight and more economical than presently available tree shears. Further, by rotating the movable cutting blade about an eccentric pin the tree shear of this invention compensates for cutting blade edge wear and considerably increases the useful life of the cutting blades.

I claim:
1. A shear comprising:
a fixed frame means including a first cutting blade and an eccentric pin means;
a movable frame means pivotally mounted on said eccentric pin means on said fixed frame means and including a second cutting blade adapted to move from an open position to a closed position into engagement with said first cutting blade for cutting objects positioned between said first and second cutting blades;
and actuating means mounted within said fixed frame means for moving said movable frame means and said second cutting blade to said open and closed positions.

2. A shear as set forth in claim 1 wherein said actuating means includes a closed cylinder, a piston positioned for reciprocal movement within said cylinder, a piston rod connected to said piston at one end and to said movable frame means at the other end, and a reversible source of hydraulic fluid adapted to force hydraulic fluid against opposite sides of said piston within said cylinder to move said piston relative to said cylinder.

3. A tree shear comprising:
a fixed frame means including a first cutting blade and an eccentric pin means;
a movable frame means pivotally mounted on said eccentric pin means on said fixed frame means and including a second cutting blade adapted to move from an open position to a closed position into engagement with said first cutting blade for completely severing a tree positioned between said first and second cutting blades;
and actuating means mounted within said fixed frame means for moving said movable frame means and said second cutting blade to said open and closed positions.

4. A tree shear as set forth in claim 3 wherein said actuating means includes a closed cylinder, a piston positioned for reciprocal movement within said cylinder, a piston rod connected to said piston at one end and to said movable frame means at the other end, and a reversible source of hydraulic fluid adapted to force hydraulic fluid against opposite sides of said piston within said cylinder to move said piston relative to said cylinder.

* * * * *